United States Patent [19]

Whetstone

[11] Patent Number: 4,874,019

[45] Date of Patent: Oct. 17, 1989

[54] WALLCOVERING SUBSTRATE FORMED OF TEXTURED, CONTINUOUS, MULTI-FILAMENT YARNS HAVING HYDROPHILIC CHARACTERISTICS

[76] Inventor: James H. Whetstone, 3012 Lake Forest Dr., Greensboro, N.C. 27408

[21] Appl. No.: 329,288

[22] Filed: Mar. 27, 1989

Related U.S. Application Data

[62] Division of Ser. No. 146,968, Jan. 22, 1988.

[51] Int. Cl.[4] ............................................. D03D 15/10
[52] U.S. Cl. ................................. 139/420 A; 139/435; 428/196; 428/247; 428/255; 428/395
[58] Field of Search ........................... 139/420 A, 435; 428/196, 247, 255, 395

[56] References Cited

U.S. PATENT DOCUMENTS

| | | | |
|---|---|---|---|
| 4,246,311 | 1/1981 | Hirst | 428/195 |
| 4,460,643 | 7/1984 | Stevens et al. | 428/284 |
| 4,756,714 | 7/1988 | Hendrix | 428/395 |
| 4,767,669 | 8/1988 | Conklin et al. | 428/395 |
| 4,774,135 | 9/1988 | Bryant | 28/182 |

*Primary Examiner*—James C. Cannon
*Attorney, Agent, or Firm*—Rhodes and Coats

[57] ABSTRACT

A textured, continuous, multi-filament polyester yarn has an ethoxylated alkyl aryl alcohol based surfactant incorporated into the interfilamentary structure thereof either during the texturizing process or after the yarn has been made into a gauze-like fabric substrate. The ethoxylated alkyl aryl alcohol based surfactant is characterized in that it is water dispersible and water insoluble; has an HLB scale in the range of 7-10; is compatible with conventional wallpaper glues; is of a viscosity in the range of 50-100 SUS depending on the yarn denier; and has a smoke point greater than 350° F. The yarn so treated is formed into a gauze fabric substrate and affixed to the rear surface of a sheet material such as a vinyl wallcovering. When the glue is applied to the sheet material the surfactant treatment alters the normally hydrophobic characteristics exhibited by the textured polyester yarn so that the characteristics actually become hydrophilic. Because of the hydrophilic characteristics glue is accepted into and held within the interfilamentary structure of the yarn until the sheet material is affixed to the wall or other surface, thereby bonding the substrate thereto.

7 Claims, 1 Drawing Sheet

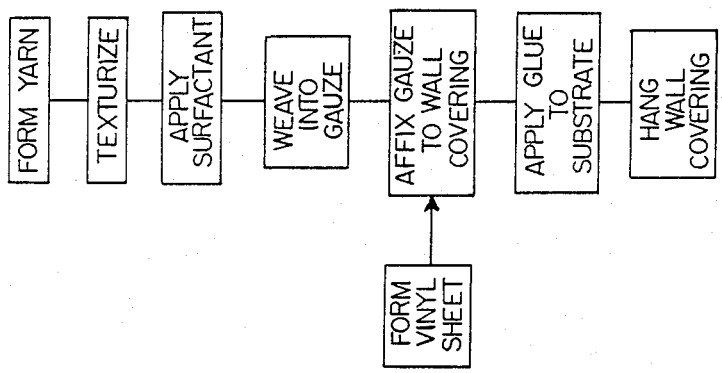
FIG. 6
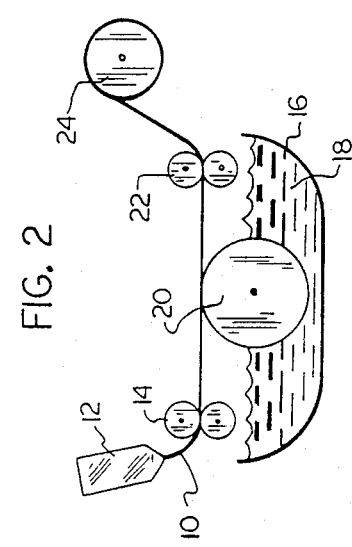
FIG. 2
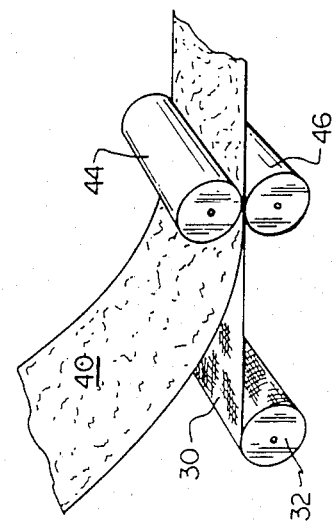
FIG. 4
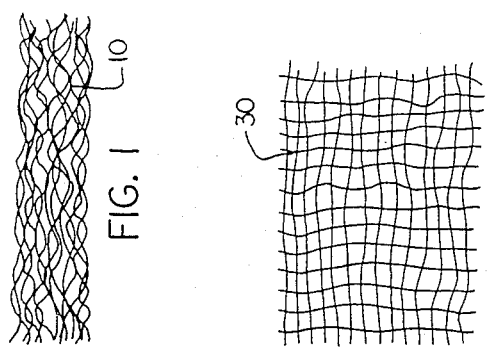
FIG. 1
FIG. 3
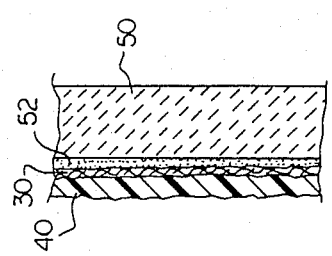
FIG. 5

WALLCOVERING SUBSTRATE FORMED OF TEXTURED, CONTINUOUS, MULTI-FILAMENT YARNS HAVING HYDROPHILIC CHARACTERISTICS

This application is a divisional application of my co-pending application Ser. No. 146,968, filed Jan. 22, 1988.

BACKGROUND AND SUMMARY OF THE PRESENT INVENTION

The present invention is directed to substrates for wallcovering, and more specifically to a gauze substrate formed of a synthetic continuous, multi-filament polymeric yarn.

Products such as vinyl wallcovering conventionally must be provided with a gauze substrate mechanically affixed to the rear surface thereof. The gauze substrate is compatible with a wet bonding agent (water based glue) to hold the glue in place adjacent the rear of the sheet material until the sheet has been applied to a selected surface (a wall in the case of wallpaper). When the glue or resin has had an opportunity to cure, the gauze substrate (and thus the wallcovering) is bonded to the surface. Vinyl sheet materials will not, in and of themselves, either absorb or hold the glue in place during the curing process, because vinyl is a hydrophobic material.

The gauze substrate is generally woven from a spun yarn formed principally of cellulosic fibers such as cotton. As used herein the term "principally" or "primarily" means 50% or greater. There are several objections to cotton, but before the present invention no satisfactory solutions to the problems or objections had been developed. The problems or objections are first that spun cellulosic materials are relatively very expensive as compared with a gauze formed of textured, continuous, multi-filament polymeric yarns such as nylon and polyester. The steps involved in forming a spun yarn are several and increase the cost thereof. Further, it is difficult to weave high cellulosic content yarns on modern, economical high speed, fluid jet looms (water or air). In the case of water jet looms the yarn tends to swell in the presence of the water and is therefore difficult to weave. Spun yarns also tend to include more defects than textured yarns, also making the processing more difficult.

Some examples of polyester or other polymeric fibers formed into a non-woven mat or web and used as a backing or base for vinyl wallcoverings are described in U.S. Pat. Nos. 4,560,643 and 4,246,311. However, the polyester or polymeric fibers in these illustrations are formed into a non-woven web or batt and impregnated with a latex binder. This is also a relatively expensive procedure leading to a different type of wallcovering. The gauze substrate envisioned by the present invention merely adapts conventional vinyl wallcoverings by affixing (embedding the substrate) into the rear surface resulting in a relatively thin wallcovering.

Previous attempts to use gauze formed of woven, continuous, multi-filament, polymeric yarns such as polyester or nylon as a wallcovering substrate have failed for two reasons. First, the textured, continuous multi-filament polymeric yarns generally tend to shrink. Secondly, polymeric materials such as polyester and nylon are generally hydrophobic and tend to repel moisture. Therefore, such yarns are not compatible to receive and maintain the resinous glue in position as the glue is curing. As a result the wallpaper does not bond to the wall surface.

Because of the tremendous savings potential to be realized from the use of woven polymeric gauze, however, efforts have continued to overcome the problems above, thereby adapting up to 100% polyester and/or nylon yarns for use in such gauze substrates. First, the advent of texturing procedures which resulted in non-shrink polyester encouraged applicant to address seriously the hydrophobic question. After further investigation, it was found that the addition of certain selected surfactants to textured, continuous, multi-filament polyester yarn changed the hydrophobic characteristics of the yarn into more hydrophilic characteristics. The selected surfactant(s) was water dispersible, but not water soluble, so that the surfactant could work its way into the interfilamentary structure, yet not be washed out during the weaving operation. It should be noted that the hydrophobic filaments themselves were not actually made hydrophilic, rather the nature of the textured, continuous, multi-filament yarn was hydrophobic in that it no longer tended to repel moisture, but would trap the moisture within the interfilamentary structure thereof.

Not all surfactants will satisfactorily accomplish the objects of the present invention, it being determined that the surfactants selected must have the characteristics of being water dispersible, but not water soluble; having a hydrophilic, lipophilic bonding factor (HLB scale) in the range of 7-10; having a viscosity in the range of 50-100 Saybolt Universal Seconds (SUS); and having a smoke point greater than 350° F. A surfactant with such characteristics will satisfactorily treat the yarn as part of the texturizing process and be compatible with the water jet weaving operation.

It is therefore an object of the present invention to provide an improved wallcovering gauze substrate.

It is another object of the present invention to provide a substrate of the type described which is formed of textured, continuous, multi-filament polyester or nylon yarn.

It is yet another object of the present invention to provide a substrate of the type described formed of yarns of the type described in which the polymeric yarns are so treated as to have a hydrophilic characteristic.

It is another object of the present invention to form a polyester or nylon gauze substrate which has hydrophilic characteristics to the extent that it will accept and hold conventional water base wallcovering glue until the glue cures thus bonding the substrate to a wall surface.

It is yet a further object of the present invention to provide a textured, continuous, multi-filament polyester or nylon yarn that has hydrophilic characteristics.

Other objects and a fuller understanding of the invention will become apparent from reading the following detailed description of a preferred embodiment along with the accompanying drawings in which:

FIG. 1 is a schematic representation of a continuous, multi-filament, textured yarn;

FIG. 2 is a schematic representation of a texturizing process which includes a means for applying a chemical treatment according to the present invention;

FIG. 3 is a plan view of a woven gauze substrate formed of the yarn of FIGS. 1 and 2;

FIG. 4 is a schematic representation of a processing apparatus for forming a wallcovering with the gauze of FIG. 3 embedded therein;

FIG. 5 is a sectional view illustrating a wallcovering having the substrate according to the present invention embedded therein and applied to a wall surface; and FIG. 6 is a flow chart describing the steps of the process of the present invention.

DETAILED DESCRIPTION OF A PREFERRED EMBODIMENT

Turning now to the drawings, there is described the present invention which has several aspects. First of all, there is provided an improved textured polymeric yarn having hydrophilic characteristics and the method of forming such a yarn; there is provided an improved substrate which is formed predominantly of texturized polymeric yarns which is compatible with water jet weaving operation and which is so treated as to form a mechanism for adhering such polymeric wallcoverings to wall surfaces; and there is provided a unique wallcovering which utilizes a predominantly polymeric gauze substrate embedded in the rear surface thereof and having the capability of bonding the wallcovering to a wall surface. In general, the common concept which links the foregoing aspects together is the incorporation of a surfactant having certain selected characteristics into a textured, continuous, multi-filament polymeric yarn to provide the polymeric yarn with hydrophilic characteristics, so that when the yarn is formed into a fabric to be utilized as a substrate, the substrate has the unique feature of bonding the vinyl sheet material to a selected surface utilizing conventional water base glues, which vinyl sheet material is otherwise not receptive to said glues.

The first step in accomplishing the invention is best shown in FIGS. 1 and 2, wherein the textured, continuous, multi-filament, polymeric yarn 10 of FIG. 1 has incorporated the aforesaid surfactant thereinto. The yarn may be formed of several types of polymeric filaments, e.g. polyester and nylon; however, for purposes of describing the present invention, polyester has been selected, applied, and tested. Thus the textured yarn 10 of FIG. 1 is formed of continuous polyester filaments. It is contemplated that the technique of the present invention would also be applicable to blended yarns, formed predominantly of spun polymeric staple if desired, however, such yarns forms have not been actually tested. It is possible such yarns might have sufficient hydrophilic characteristics because of their surface configuration. If not, however, the teaching of the present invention would be applicable.

In FIG. 2, there is illustrated schematically a conventional texturing process in which the multi-filament yarn 10 is passed through a texturing apparatus 12, which apparatus may utilize any of the conventional texturing processes such as false twist texturing, air jet texturing, stuffer box texturing, edge crimping, gear crimping, and the like. After passing through the texturing apparatus 12, a guide system 14 directs the yarn 10 over a kiss roll 20, which kiss roll 20 is partially submerged in a trough 16 containing the surfactant 18 to be explained hereinafter. A second guide system 22 directs the chemically treated yarn along to a takeup package 24.

The chemical itself is a surfactant having certain characteristics or parameters. Since one of the objects of the yarn is to be processed by a water jet loom, the treated yarn will be rewet during the weaving operation. Thus the surfactant must be able to withstand the water from the water jet loom and not be washed out during weaving. Therefore, while the surfactant should be water dispersible (to enhance dispersion into the interfilamentary structure of the yarn, it should not be water soluble). Secondly, in order to be receptive to the water based glue the surfactant should have hydrophilic lipophilic bonding characteristics such that the HLB factor falls in the range of 7-10. Naturally the surfactant must be compatible with conventional wallcovering glues.

In order to be water dispersible into the interfilamentary structure of the yarn 10, the surfactant must have a viscosity in the range of 50-100 Saybolt Universal Seconds (SUS) depending on the yarn. Finally, since the substrate into which the yarn is woven will be embedded into the vinyl wallcovering during an operation involving heat and pressure, the surfactant must be able to withstand temperatures above a prescribed level. Therefore, the smoke point of the surfactant must be above 350° F. One surfactant which has been selected and which has tested satisfactorily has an ethoxylated alkyl aryl alcohol base. Specifically the surfactant selected and tested is Lurol 2405 by George A. Goulston, Inc. of Monroe, N.C.

The selected surfactant is preferably introduced to the yarn during the texturing process as described and illustrated in FIG. 2. Alternatively, the surfactant could be applied to the yarn in a separate operation; while the yarn is on the yarn package; or even after the yarn is woven into the gauze fabric. When intended for use as a substrate for wallcovering, specifications require that a wallcovering be able to exhibit a 0.35 pound pull strength. Tests have shown that the use of quantities of surfactant in the range of 1.1% by weight of yarn are inadequate to achieve the 0.35 pound pull strength. As a matter of fact, a quantity of 1.1% by weight of surfactant to yarn results in a pull strength of only 0.18 pounds. On the other hand surfactant in amounts of 3% by weight have achieved a pull strength of 0.5 pounds. Therefore, it is believed that surfactant in the amount of at least 2.5% by weight of surfactant to yarn will be adequate to achieve the 0.35 pound pull strength requirement. In actuality, the weight of the polyester yarn processed was 159 denier prior to the addition of the additive. In order to achieve the 3% additive, the speed of the kiss roll 20 was controlled until the yarn denier of the yarn after treatment reached 164.

The application of the surfactant swells the orifices (called dye sites) in the textured, multi-filament polyester yarn. The surfactant causes the glue to spread evenly across the surface of all filaments to the extent that the glue will bond the polyester filaments to the wall surface. Use of the surfactant allows the polyester to become wet and increases the tendency of the surfactant to enter the interfilamentary structure of the yarn. Then when the glue or adhesive is applied to the yarn after it is woven into the gauze substrate and embedded in the surface of the wallcovering, the glue adheres to the entire surface of the yarn filaments and actually bonds the substrate to the wall surface. Since the substrate is embedded in the rear surface of the wallcovering, the wallcovering is thus caused to adhere to the wall. Actually the vinyl wallcovering is not, in and of itself glued to the wall, rather the substrate is glued to the wall.

The treated yarn referred to hereinabove is formed into the gauze structure illustrated in FIG. 3. The weaving operation is preferably carried out on a fluid jet loom (water or air).

The gauze substrate 30 illustrated in FIG. 3 is embedded into the vinyl wallcovering or sheet material 40 as best illustrated in FIG. 4. Once the molten vinyl is extruded into the sheet material 40 (FIG. 4), it is joined to the gauze 30 which is being fed by a feed roll 32. The vinyl sheet material 40 and gauze 30 continue in contiguous arrangement through a pair of calendar rolls 44, 46 where the gauze is caused to be embedded into the underneath surface of the sheet material 40. The calendar rolls 44, 46 are maintained at a temperature of approximately 350° F. The upper calendar roll 44 may be provided with an embossed pattern to decorate the front surface of the vinyl sheeting 40, if desired.

In FIG. 5, there is illustrated the completed construction which includes the vinyl wallcovering 40 having the gauze 30 embedded threrein joined to a wall surface 50 by a conventional water base glue 52. Examples of conventional water based wallcovering glues include GT-12 and GT-460A produced by Roman Adhesives, Inc. of Bloomfield, N.J. As stated previously, when the glue is applied to the rear surface of the wallcovering 40 it mechanically affixes to the gauze substrate 30 embedded in the rear surface thereof and bonds the substrate 30 to the surface of wall 50. The moisture in the glue is absorbed into the surfactant clinging to the gauze, and when dry, the glue mechanically bonds the gauze to the wall.

In FIG. 6, the entire process is summarized. While the yarn has been described herein as being used in the formation of a gauze substrate for wallcoverings, the yarn itself may have other significant utilization. To the knowledge of applicant, the yarn of the present invention is the first incident of a polymeric yarn (hydrophobic characteristics) being modified in the yarn form by the use of a surfactant additive to have hydrophilic characteristics. Secondly, the gauze substrate may have application in other environments than the cited examples of wallcoverings. The gauze substrate of the present invention permits a hydrophilic gauze to be woven more economically on a water jet loom. The resulting polyester or polymeric gauze, as a result of the present invention, can then be embedded in a vinyl sheet material which can then be bonded to any desired surface.

There has been described in detail hereinabove a preferred embodiment of the present invention. Some modifications have been cited specifically. Other modifications may come to mind. The present invention should be limited only by the following claims.

What is claimed is:

1. Improved gauze formed primarily of textured, continuous, multi-filament, polymeric yarns having a surfactant incorporated into the interfilamentary structure thereof; said surfactant having the characteristics of:

(a) being water dispersible and water insoluble;
    (b) having an HLB factor in the range of 7-10; and
    (c) being heat stable to at least 350° F.

2. The gauze according to claim 1 wherein the viscosity of said surfactant is in the range of 50-100 SUS.

3. The gauze according to claim 1 wherein said polymeric yarn is 100% polyester.

4. The gauze according to claim 1 wherein said polymeric yarn is 100% nylon.

5. The gauze according to claim 1 wherein said surfactant has an ethoxylated alkyl aryl alcohol base.

6. The gauze according to claim 1 wherein said surfactant is present in said gauze in an amount of at least 2.5% surfactant to yarn weight.

7. The gauze according to claim 1 wherein said surfactant is present in an amount of at least 3% surfactant to yarn weight.

* * * * *